UNITED STATES PATENT OFFICE.

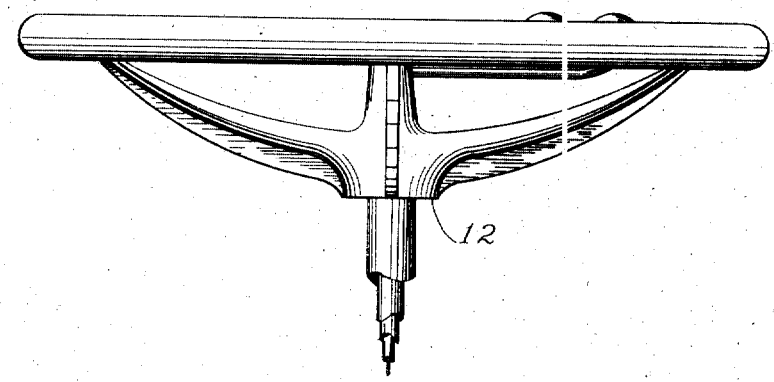
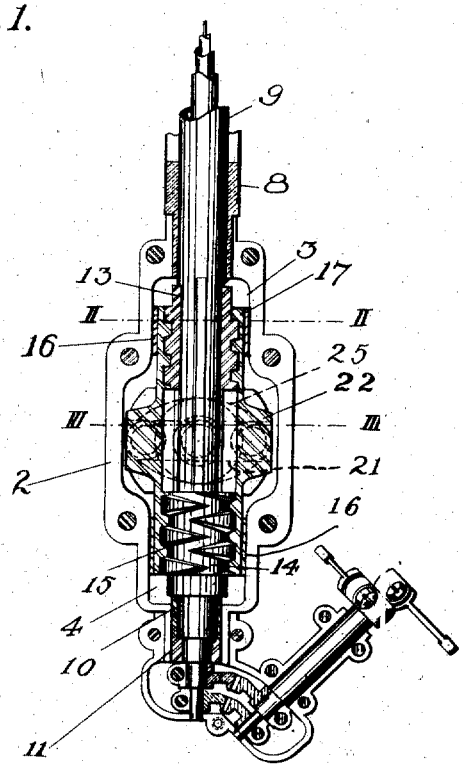

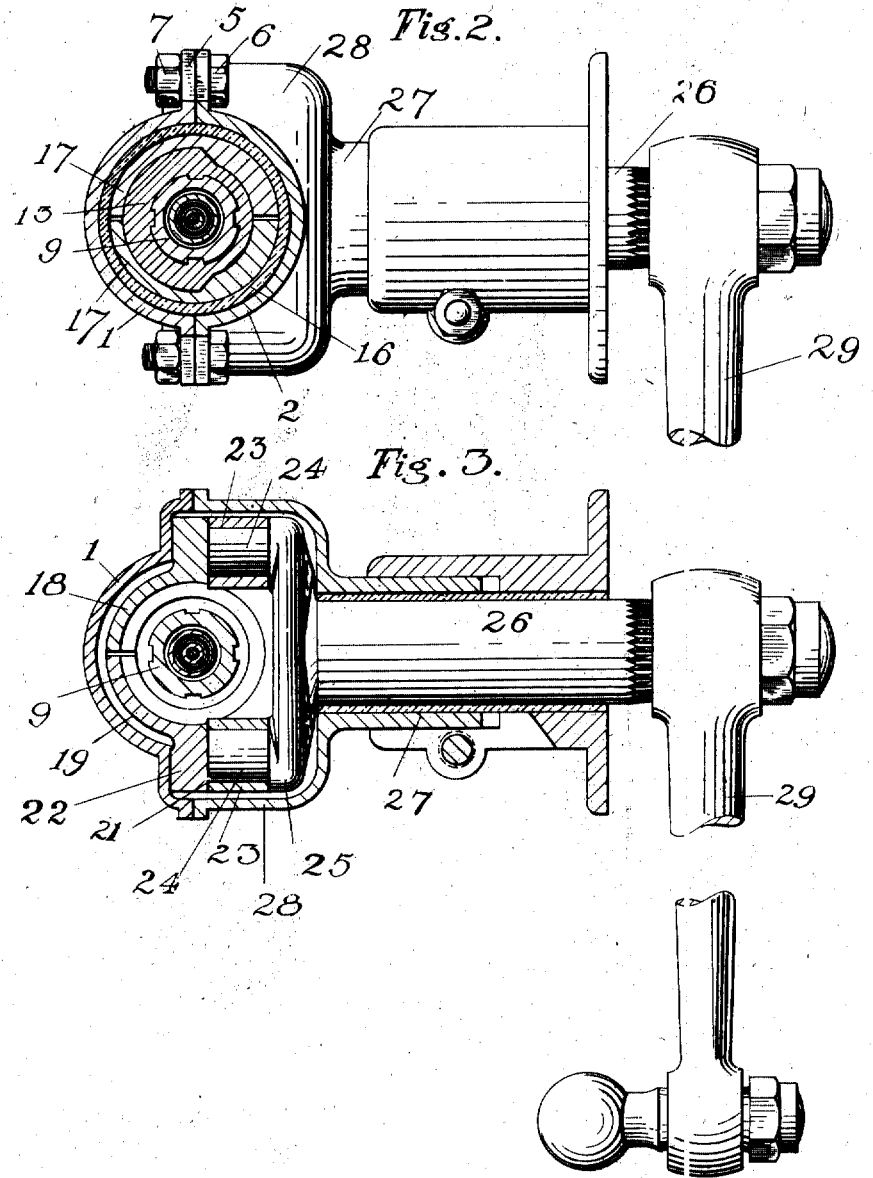

JOSEPH P. LAVIGNE, OF DETROIT, MICHIGAN.

STEERING-GEAR.

1,222,872. Specification of Letters Patent. Patented Apr. 17, 1917.

Application filed November 27, 1914. Serial No. 874,170.

*To all whom it may concern:*

Be it known that I, JOSEPH P. LAVIGNE, a citizen of the United States of America, residing at Detroit, in the county of Wayne and State of Michigan, have invented certain new and useful Improvements in Steering-Gear, of which the following is a specification, reference being had therein to the accompanying drawings.

In Patent #993,326 granted May 23rd., 1911, there is disclosed a steering gear for motor vehicles, wherein a threaded shaft is employed for moving parts or sections of a nut in opposite directions for imparting movement to a rock shaft, which transmits motion to the steering knuckles or other parts to be actuated by the steering gear.

The present invention is an improvement upon the above construction and besides having the same objects in view disclosed in the above patent, the present invention aims to provide a novel steering shaft and a novel two-part or sectional nut that obviates the necessity of using a multiplicity of threads to transmit motion from the shaft to the parts of the nut. The threaded connection between the steering shaft and the parts of the nut is such that lost motion caused by wear is reduced to a minimum. This and other objects are attained by a durable and inexpensive mechanical construction that will be hereinafter specifically described and then claimed.

In the drawing,

Figure 1 is a side elevation of a portion of a steering post, showing the steering gear partly in elevation and partly in longitudinal section;

Fig. 2 is an enlarged transverse sectional view taken on the line II—II of Fig. 1, and Fig. 3 is a similar view taken on the line III—III of Fig. 1.

In the drawings, 1 and 2 denote the parts or halves of a cylindrical casing having reduced ends 3 and 4. The parts or halves of the casing are flanged, as at 5 and the flanges thereof connected together by screw bolts 6, nuts 7 or other fastening means.

The reduced end 3 of the casing is provided with a bearing 8 for a hollow shaft or spindle 9, said shaft extending longitudinally of the casing and having the lower end thereof journaled in a bushing 10 mounted in an extensior 11 of the reduced end 4 of the casing. The upper end of the shaft 9 has a conventional form of steering wheel 12 and extended through the hollow shaft 9 are the ordinary rod, tube and sleeves actuated at the steering wheel for controlling devices of the motor.

Keyed, splined, or otherwise mounted upon the hollow shaft 9, within the casing, are sleeves 13 and 14, said sleeves extending into the reduced ends 3 and 4 of the casing. The sleeves 13 and 14 are spaced apart and the periphery of each sleeve is provided with cross-cut or diamond-shaped threads 15 forming right hand screw threads for one sleeve and left hand screw threads for the other sleeve.

Arranged in the reduced ends 3 and 4 of the casing are bushings or bearings 16 and journaled in said bearings are the semi-cylindrical end portions 17 of a two-part or sectional nut, the parts of the nut being designated as 18 and 19. One part of the nut has the semi-cylindrical end portions thereof provided with right hand screw threads and the other part of the nut with left hand screw threads, the screw threads meshing with the threads 15 of the sleeves 13 and 14, whereby when the hollow shaft 9 is rotated the two-halves of the nut will be moved in opposite directions. Each half of the nut is formed with a transverse slot 21, said slots being formed in enlargements 22 intermediate the ends of the nut. The slots 21 receive blocks 23 which are free to slide therein toward and from the shaft 9. These blocks form bearings for studs 24 upon the ends of a cross head or plate 25 formed integral with a rock shaft 26 extending laterally outward through a bearing 27 at one side of the casing. The cross head or plate 25 lies close to the side of the nut within a recess or off-set portion 28 of the part 2 of the casing.

When the hollow shaft 9 is rotated to move one half of the nut in one direction and the other half in the opposite direction, said cross-head or plate is turned to actuate the rock shaft by virtue of the studs 24 extending into the bearing blocks 23, which are carried within the guide grooves 21 of the two parts of the nut and moved with said parts longitudinally of the shaft.

The outer end of the rock shaft 26 has the ordinary crank 29 for transmitting motion to the steering knuckle or other part to be actuated by the steering gear.

Attention is directed to the parts of the nut and their threaded connection with the hollow shaft 9. It has been found that to screw thread the parts of the nut their entire length and thread the shaft or use an elongated threaded sleeve that there is an inequality between the threads at one end of the nut and the threads at the opposite end of the nut. It is practically impossible to remove this inequality by machining and consequently there is lost motion or friction, some times lost motion at one end of the nut and undue friction at the opposite end thereof. To eliminate this troublesome feature in connection with a steering gear, also the expense incurred thereby, is the principal object of my improvement. I accomplish satisfactory results, without sacrificing strength or rigidity, by using the separated sleeves and simply interiorly screw threading the ends of the parts of the nut, as clearly shown in Fig. 1. In consequence of this construction there is an even and uniform action of the parts of the nut relatively to the shaft, and while I have herein illustrated one embodiment by which this is accomplished, I desire it to be understood that the structural elements are susceptible to such variations and modifications as fall within the scope of the appended claim.

What I claim is:—

In a steering gear, a casing, a shaft extending longitudinally thereof and of one diameter throughout, sleeves spaced apart on said shaft within said casing and adapted for rotation with said shaft and provided with diamond threads, a sectional nut within said casing having the ends thereof journaled in the ends of said casing, the sections of said nut being in screw threaded engagement with the diamond threads of said sleeves and devoid of screw threads elsewhere whereby one part of said nut is moved in one direction and the other part in another direction by a rotative movement of said shaft, and a rock shaft supported by said casing and having connection with the parts of said nut whereby said shaft is rocked by a movement of the parts of said nut.

In testimony whereof I affix my signature in presence of two witnesses.

JOSEPH P. LAVIGNE.

Witnesses:
ANNA M. DORR,
G. E. McGRANN.